United States Patent
Mohandoss et al.

(10) Patent No.: US 12,394,234 B2
(45) Date of Patent: Aug. 19, 2025

(54) SECURITY-BASED IMAGE CLASSIFICATION USING ARTIFICIAL INTELLIGENCE TECHNIQUES

(71) Applicant: Dell Products L.P., Round Rock, TX (US)

(72) Inventors: Franklin Jebadoss Mohandoss, Austin, TX (US); Bijan Kumar Mohanty, Austin, TX (US); Ramesh Rajendra Rao, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 327 days.

(21) Appl. No.: 17/947,385

(22) Filed: Sep. 19, 2022

(65) Prior Publication Data

US 2024/0096122 A1     Mar. 21, 2024

(51) Int. Cl.
| | |
|---|---|
| *G06V 10/82* | (2022.01) |
| *G06F 40/284* | (2020.01) |
| *G06V 30/148* | (2022.01) |
| *G06V 30/19* | (2022.01) |
| *G06V 30/413* | (2022.01) |
| *G06V 30/416* | (2022.01) |

(52) U.S. Cl.
CPC ........ *G06V 30/19173* (2022.01); *G06V 10/82* (2022.01); *G06V 30/148* (2022.01); *G06V 30/19147* (2022.01); *G06F 40/284* (2020.01)

(58) Field of Classification Search
CPC ............. G06V 30/19173; G06V 10/82; G06V 30/148; G06V 30/19147; G06V 30/416; G06V 30/413; G06F 40/284; G06F 40/216; G06F 40/30

USPC ......................................................... 382/157
See application file for complete search history.

(56) References Cited

U.S. PATENT DOCUMENTS

| | | | |
|---|---|---|---|
| 10,395,772 B1 * | 8/2019 | Lucas ................... | G16H 10/60 |
| 10,891,485 B2 | 1/2021 | Anorga | |
| 11,188,746 B1 * | 11/2021 | Patel ...................... | G06F 40/40 |
| 11,410,409 B2 | 8/2022 | Kigawa | |
| 2010/0138459 A1 | 6/2010 | Kasmirsky | |
| 2010/0332401 A1 | 12/2010 | Prahlad | |
| 2013/0132959 A1 * | 5/2013 | Moore ................... | G06Q 50/01 |
| | | | 718/100 |

(Continued)

FOREIGN PATENT DOCUMENTS

CN         108415666 A         8/2018

*Primary Examiner* — Beniyam Menberu
(74) *Attorney, Agent, or Firm* — Ryan, Mason & Lewis, LLP

(57) ABSTRACT

Methods, apparatus, and processor-readable storage media for security-based image classification using artificial intelligence techniques are provided herein. An example computer-implemented method includes obtaining one or more images; extracting text from at least a portion of the one or more images by processing the one or more images using at least a first set of one or more artificial intelligence techniques; classifying at least one of the one or more images, into one or more of multiple security-based classification categories, by processing at least a portion of the extracted text using at least a second set of one or more artificial intelligence techniques; and performing one or more automated actions based at least in part on the classifying of the at least one of the one or more images.

20 Claims, 6 Drawing Sheets

(56) References Cited

U.S. PATENT DOCUMENTS

| | | | |
|---|---|---|---|
| 2014/0258283 A1* | 9/2014 | Charng | G06F 16/156 |
| | | | 707/728 |
| 2014/0293069 A1 | 10/2014 | Lazar | |
| 2016/0147954 A1 | 5/2016 | Ng Tari | |
| 2020/0226288 A1* | 7/2020 | Zhang | G06N 3/04 |
| 2021/0224744 A1 | 7/2021 | Selvaraju | |
| 2022/0027611 A1 | 1/2022 | Yu et al. | |
| 2022/0044358 A1 | 2/2022 | Wang et al. | |
| 2022/0058383 A1* | 2/2022 | Seth | G06V 30/19107 |
| 2022/0067902 A1 | 3/2022 | Dou et al. | |
| 2022/0101040 A1 | 3/2022 | Zhang et al. | |
| 2022/0222481 A1* | 7/2022 | Mohanty | G06F 40/284 |
| 2022/0253645 A1* | 8/2022 | Lin | G06V 20/35 |
| 2022/0335203 A1* | 10/2022 | Van Dyke | G06F 40/205 |
| 2023/0305863 A1* | 9/2023 | Riva | G06V 10/774 |

\* cited by examiner

```
import pytesseract
pytesseract.pytesseract.tesseract_cmd = r'C:\python\Tesseract-OCR\tesseract'
print(pytesseract.image_to_string(r'D:\python\data\bsodImage.png'))
```

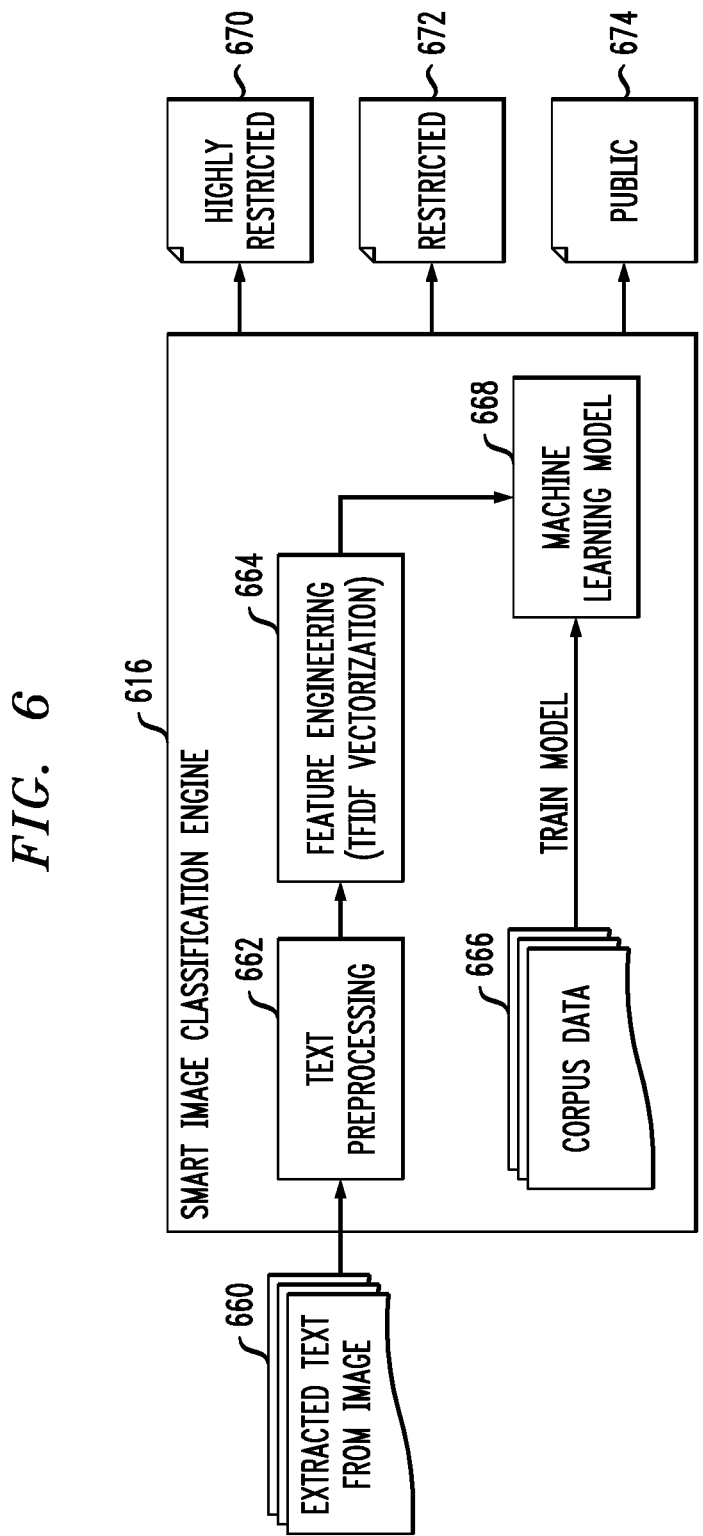

```
text = BAD_SYMBOLS_RE.sub(' ', text) # delete symbols which are in BAD_SYMBOLS_RE from text
text = ' '.join(word for word in text.split() if word not in STOPWORDS) # delete stop words from text
return text df['content'] = df['content'].apply(clean_text)
print_plot(10)
df['content'].apply(lambda x: len(x.split(' '))).sum()

x = df.content
y = df.tags
x_train, x_test, y_train, y_test = train_test_split(X, y, test_size=0.3, random_state = 42)

#Feature Engineering is done with the use of CountVectorizer and then TFIDFTransformation
#of token and then passed to a SVM Kernel in SGDClassifier
from sklearn.linear_model import SGDClassifier sgd = Pipeline([('vect', CountVectorizer()),
                ('tfidf', TfidfTransformer()),
                ('clf', SGDClassifier(loss='hinge', penalty='l2' ,alpha=1e-3, random_state=42 , max_iter=5, tol=None)),
               ])
sgd.fit(x_train, y_train)

%%time y_pred = sgd.predict(X_test)

print('accuracy %s' % accuracy_score(y_pred, y_test))
print(classification_report(y_test, y_pred,target_names=my_tags))
```

SECURITY-BASED IMAGE CLASSIFICATION USING ARTIFICIAL INTELLIGENCE TECHNIQUES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to techniques for providing security in such systems.

BACKGROUND

As part of various processes, enterprises and other organizations commonly store and manage images in applications and/or content repositories (e.g., to meet legal and/or compliance standards). Many such images, however, contain sensitive information, and conventional image processing techniques typically treat all images with similar storage, reference, and archival rules. As such, in many conventional settings, images containing sensitive information are accessible to anyone having access to the applications and/or content repositories that reference such images, creating security risks and compliance issues with respect to data protection standards.

SUMMARY

Illustrative embodiments of the disclosure provide methods for security-based image classification using artificial intelligence techniques. An exemplary computer-implemented method includes obtaining one or more images, and extracting text from at least a portion of the one or more images by processing the one or more images using at least a first set of one or more artificial intelligence techniques. The method also includes classifying at least one of the one or more images, into one or more of multiple security-based classification categories, by processing at least a portion of the extracted text using at least a second set of one or more artificial intelligence techniques. Additionally, the method includes performing one or more automated actions based at least in part on the classifying of the at least one of the one or more images.

Illustrative embodiments can provide significant advantages relative to conventional image processing techniques. For example, problems associated with security risks and compliance issues with respect to data protection standards are overcome in one or more embodiments through automatically classifying images based at least in part on processing text data contained within the images.

These and other illustrative embodiments described herein include, without limitation, methods, apparatus, systems, and computer program products comprising processor-readable storage media.

BRIEF DESCRIPTION OF THE DRAWINGS

FIG. 6 shows architecture of an example smart image classification engine in an illustrative embodiment.

FIG. 7 shows example pseudocode for implementing at least a portion of a smart image classification engine in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
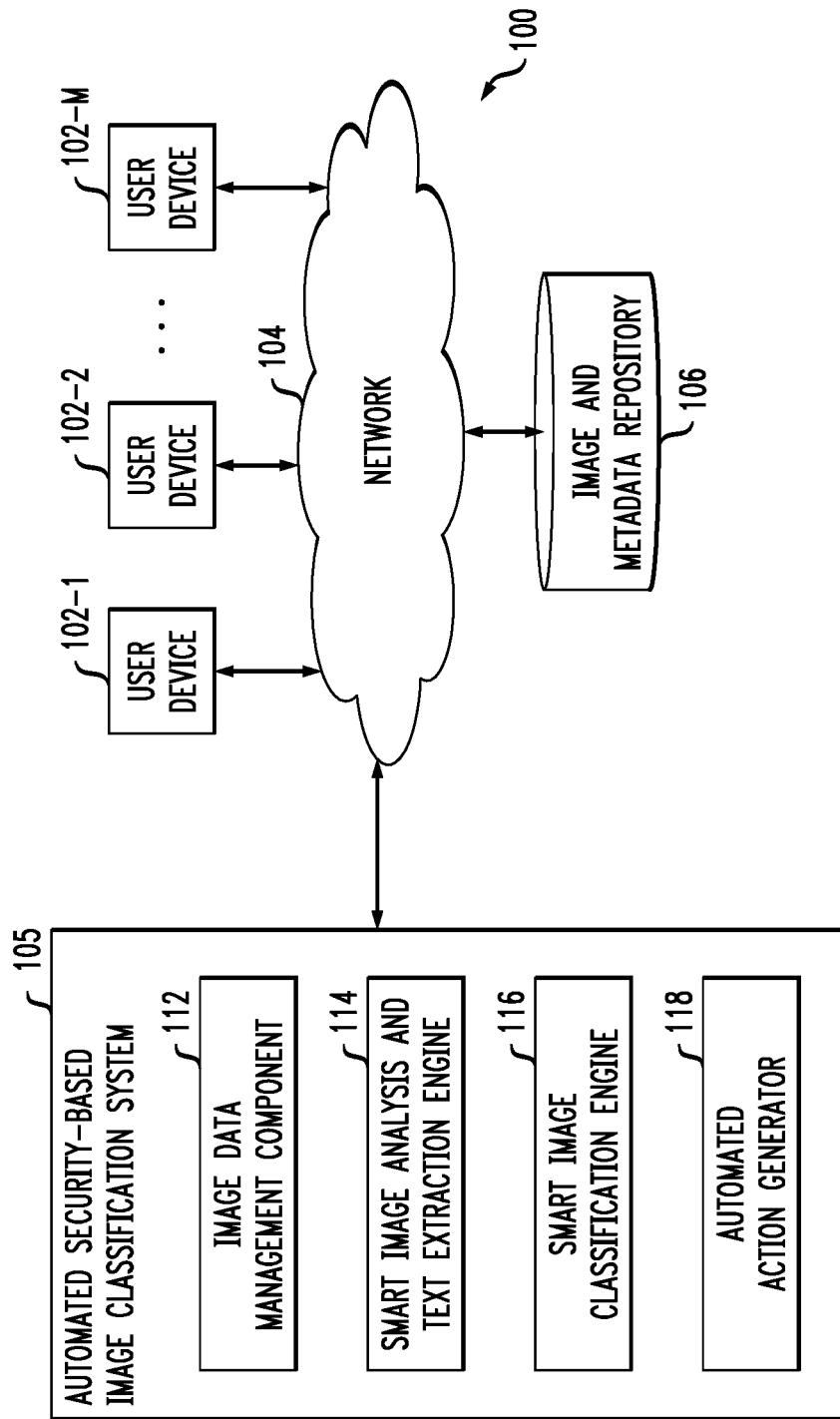
FIG. 1 shows an information processing system configured for security-based image classification using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated security-based image classification system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated security-based image classification system 105 can have an associated image and metadata repository 106 configured to store image data (e.g., provided by one or more image data sources, management systems, etc.) as well as metadata pertaining to images, which comprise, for example, security class information and/or privacy class information.

The image and metadata repository 106 in the present embodiment is implemented using one or more storage systems associated with automated security-based image classification system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated security-based image classification system 105 are one or more input-output devices, which illustratively comprise keyboards, displays or other types of input-output devices in any combination. Such input-output devices can be used, for example, to support one or more user interfaces to automated security-based image classification system 105, as well as to support communication between automated security-based image classification system 105 and other related systems and devices not explicitly shown.

Additionally, automated security-based image classification system 105 in the FIG. 1 embodiment is assumed to be implemented using at least one processing device. Each such processing device generally comprises at least one processor and an associated memory, and implements one or more functional modules for controlling certain features of automated security-based image classification system 105.

More particularly, automated security-based image classification system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated security-based image classification system 105 to communicate over the network 104 with the user devices 102, and illustratively comprises one or more conventional transceivers.

The automated security-based image classification system 105 further comprises image data management component 112 (which can include, for example, a customer relationship management (CRM) system and/or a case management system), smart image analysis and text extraction engine 114, smart image classification engine 116, and automated action generator 118.

It is to be appreciated that this particular arrangement of elements 112, 114, 116 and 118 illustrated in the automated security-based image classification system 105 of the FIG. 1 embodiment is presented by way of example only, and alternative arrangements can be used in other embodiments. For example, the functionality associated with elements 112, 114, 116 and 118 in other embodiments can be combined into a single module, or separated across a larger number of modules. As another example, multiple distinct processors can be used to implement different ones of elements 112, 114, 116 and 118 or portions thereof.

At least portions of elements 112, 114, 116 and 118 may be implemented at least in part in the form of software that is stored in memory and executed by a processor.

It is to be understood that the particular set of elements shown in FIG. 1 for security-based image classification using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated security-based image classification system 105 and image and metadata repository 106 can be on and/or part of the same processing platform.

An exemplary process utilizing elements 112, 114, 116 and 118 of an example automated security-based image classification system 105 in computer network 100 will be described in more detail with reference to the flow diagram of FIG. 8.

Accordingly, at least one embodiment includes implementing at least one computer vision (CV) and image processing framework to extract textual data from images and classify at least a portion of the images into various data privacy classes using artificial intelligence techniques (e.g., natural language process (NLP) techniques). As detailed herein, such an embodiment includes enabling grouping of images into specific categories and adding security-related metadata to at least a portion of the images for appropriate handling.

One or more embodiments include identifying sensitive information within one or more images (e.g., images received from users and/or customers as part of one or more enterprise processes), classifying such images in accordance with one or more security-related classifications, and augmenting at least a portion of the images with the classification-related metadata. Such an embodiment can include automatically analyzing images and/or videos collected from one or more channels (e.g., online channels and/or offline channels) using artificial intelligence techniques (e.g., CV techniques) for object detection, image classification and/or segmentation, and text detection and/or extraction. After extracting text from one or more images, such an embodiment includes leveraging NLP techniques to classify at least a portion of the one or more images based at least in part on the extracted text, and adding one or more items of security-related metadata to such images (e.g., metadata pertaining to privacy handling and/or treatment processes).

Figure 2:
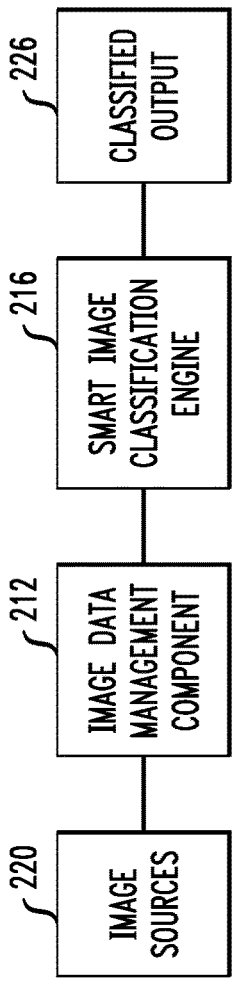
FIG. 2 shows an example workflow across various components in an illustrative embodiment.

FIG. 2 shows an example workflow across various components in an illustrative embodiment. By way of illustration, FIG. 2 depicts image sources 220, which can include, for example, social media sources, online sources, email sources, call center-related sources, etc. At least a portion of the images from image sources 220 are provided to (e.g., uploaded, attached with a message, etc.) to image data management component 212 (e.g., a customer relationship management (CRM) system and/or a case management system), which then provides such images to smart image classification engine 216. As detailed herein, smart image classification engine 216 can include an image processing component (which can further include a text extraction component) as well as an NLP model with one or more data dictionaries (e.g., one or more data dictionaries related to personal identifying information). Based on the processing of the image data by smart image classification engine 216, the example embodiment depicted in FIG. 2 includes generating a classified output 226 (which classifies and secures at least a portion of the image data).

As images are associated with derived privacy classification metadata, related handling, monitoring, and/or alerting processes can be initiated. Accordingly, with the enablement of enhanced security-related handling of images, one or more embodiments include increasing data-related compliance and reducing data security risks (e.g., penalties from privacy violations, etc.).

At least one embodiment includes generating and/or implementing components to facilitate providing end-to-end capability of enhanced privacy-related processes to image management in an enterprise. Such components include a smart image analysis and text extraction engine (as further detailed in connection with FIG. 3 as element 314) for smart image analysis, wherein such an engine includes one or more optical character recognition (OCR) tools (e.g., Python-tesseract (pyTesseract)) and at least one neural network (e.g., at least one mask region-based convolutional neural network (mask R-CNN). Additionally, as depicted in FIG. 2 and elsewhere herein, such components include a smart image classification engine, which includes one or more NLP techniques and one or more machine learning-based classification algorithms.

Figure 3:
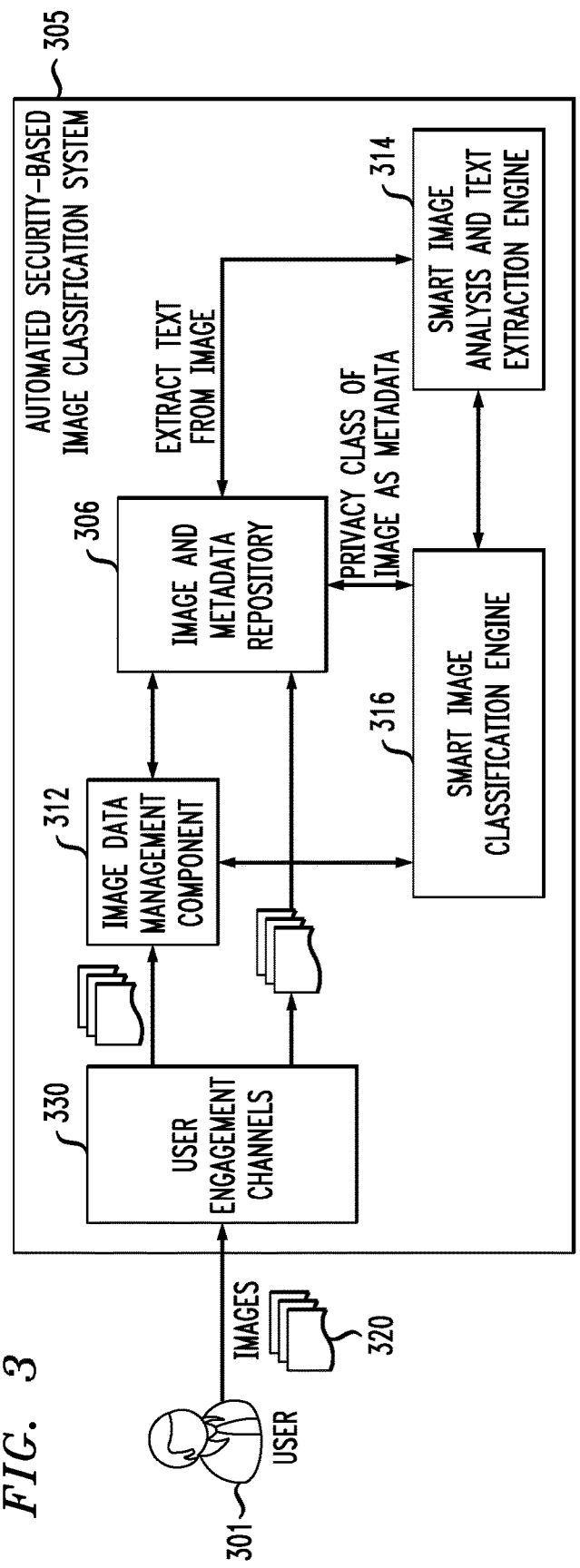
FIG. 3 shows system architecture in an illustrative embodiment.

FIG. 3 shows system architecture in an illustrative embodiment. By way of illustration, FIG. 3 depicts a user 301 providing images 320 to automated security-based image classification system 305 via one or more user engagement channels 330 (e.g., email, social media, text, etc.). Within automated security-based image classification system 305, image data management component 312 (e.g., CRM system) can process at least a portion of the images 320 and/or at least a portion of the images 320 can be provided to image and metadata repository 306. For example, in one or more embodiments, user 301 can attach images 320 in at least one CRM channel (e.g., a chat, an email, etc.) and/or upload images 320 in the image and metadata repository 306 using a portal. In such an embodiment, ultimately images 320 are to be stored in the image and metadata repository 306. Such image data can then be processed using smart image analysis and text extraction engine 314, and at least a portion of the output of such processing can be used by smart image classification engine 316 to classify the given image(s) in accordance with one of multiple security-related and/or privacy-related classes. Such classified images, along with their classifications which can be added as metadata to the given images, can then be stored in image and metadata repository 306.

In at least one embodiment, a smart image analysis and text extraction engine (e.g., element 314 in FIG. 3) is responsible for analyzing images, identifying and segmenting one or more areas of images where text data exists, and extracting at least a portion of the images for privacy analysis and classification. In such an embodiment, the images (e.g., obtained user and/or customer images within an enterprise context, such as images pertaining to invoices, machines or products, screen shots, etc.) can contain structured data and unstructured data. For instance, a smart image analysis and text extraction engine can analyze an image and extract text data from the image. As noted herein, such an engine can include using one or more OCR tools in such image analysis, such as further detailed in connection with FIG. 4.

Figures 4, 5:
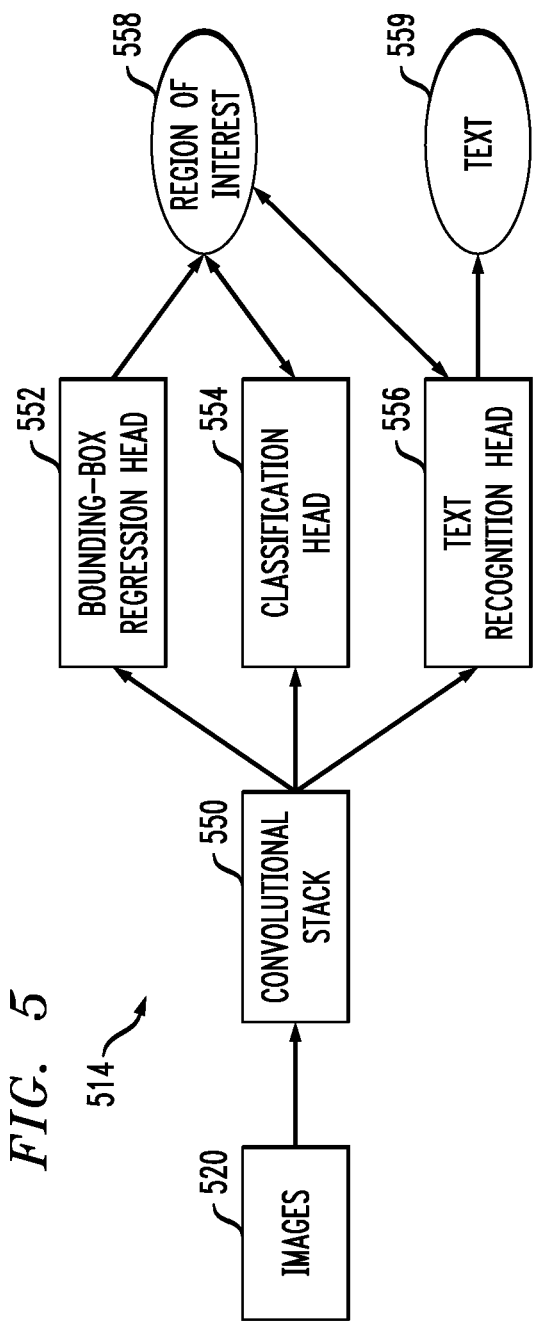
FIG. 4 shows example pseudocode for implementing text extraction techniques in an illustrative embodiment.
FIG. 5 shows architecture of an example multi-task network model in an illustrative embodiment.

FIG. 4 shows example pseudocode for implementing text extraction techniques in an illustrative embodiment. In this embodiment, example pseudocode 400 is executed by or under the control of at least one processing system and/or device. For example, the example pseudocode 400 may be viewed as comprising a portion of a software implementation of at least part of automated security-based image classification system 105 of the FIG. 1 embodiment.

The example pseudocode 400 illustrates importing and executing Python-tesseract, which is a Python library that recognizes and reads text (e.g., structured text data) embedded in an image. Accordingly, Python-tesseract can enable text extraction using the example pseudocode 400 as shown in FIG. 4.

It is to be appreciated that this particular example pseudocode shows just one example implementation of text extraction techniques, and alternative implementations of the process can be used in other embodiments.

In one or more embodiments, images containing unstructured text data can be analyzed using one or more CV techniques. By way of example, such an embodiment can include using a mask R-CNN in connection with one or more OCR techniques for tasks including object detection, text object segmentation, and text extraction. Such an embodiments can include implementing such a model to create one or more boundary boxes around one or more identified areas in the image that include one or more text objects.

Mask R-CNN, being an object detection model, provides a flexible mechanism to identify one or more regions of interest inside images. In processing images, the model considers and/or distinguishes between text objects and non-text objects. Additionally, at least one embodiment includes modifying a mask R-CNN by training the mask R-CNN with OCR-related data. As such, the model can then identify one or more regions of interest in images that are highly likely to contain text data, using a process referred to as text localization. In addition to text localization, such a model can also read and/or extract text data using a process referred to as text recognition.

Accordingly, in one or more embodiments, a modified mask R-CNN is responsible for text segmentation, which includes outlining the image area that contains text. Then, pyTesseract, an OCR library, takes that part of the image as input and extracts the text from that part of the image. Such extracted text can then be recognized and classified as a secure image by at least one NLP and machine learning-based classifier.

FIG. 5 shows architecture of an example multi-task network model 514 in an illustrative embodiment. By way of example, such a multi-task network model 514 can include and/or represent, in one or more embodiments, a smart image analysis and text extraction engine (such as depicted in FIG. 1, FIG. 2, and FIG. 3).

In one or more embodiments, such as depicted in FIG. 5, an implemented mask R-CNN model includes a multi-task network (e.g., the model will predict multiple outputs from one single input image) to achieve both text localization and text recognition. In such an embodiment, the mask R-CNN includes multiple heads, wherein one head (e.g., bounding box regression head 552) proposes one or more boundary boxes that are likely to contain objects of interest, a second head (e.g., classification head 554) classifies which type of objects (text, graphics, etc.) are contained in each box, and a third head (e.g., text recognition head 556) recognizes the text 559 contained in each box. The bounding box regression head 552, which is the text localization head, includes a two-stage mechanism with a region proposal network followed by a bounding box regression network. The output of this head includes a predicted list of regions of interest and/or locations 558 in the image that might contain text data. The classification head 554 estimates and/or predicts the class of object(s) inside the regions of interest 558 as text vs non-text (e.g., via binary classification techniques). The text recognition head 556, which identifies text 559 in the images 520, takes, as input, at least one feature map from a convolutional stack 550 and the regions of interest 558 generated from the bounding box regression head 552. The at least one feature map can be generated by applying one or more filters to the image and/or by utilizing a feature map from one or more previous layers in a CNN context.

In the example architecture depicted in FIG. 5, the multi-task network model 514 progresses forward by using the identified regions of interest 558 in connection with fetching relevant representations for each region from the convolutional stack 550 (e.g., in such an embodiment, the multiple hidden layers and the fully connected layer are referred to as the convolutional stack). In one or more embodiments, such actions can be carried out using at least one convolutional method with short-range kernel width. At each spatial step, the output of convolutions is used to predict an output letter, and the overall sequence is collapsed through a connectionist temporal classification (CTC) layer to output the final sequence for the given region of interest. Leveraging this model and using labeled images for training, such an embodiment can include extracting text data with increased performance and efficiency (e.g., relative to conventional OCR-based mechanisms).

Additionally of alternatively, one or more embodiments can include leveraging OpenCV, which is an open-source library for computer vision, machine learning, and image processing. In such an embodiment, OpenCV can be used to process images and/or videos to identify one or more objects (e.g., faces, human handwriting, etc.). When integrated with one or more libraries (e.g., NumPy) python is capable of processing an OpenCV array structure for analysis (e.g., for text extraction).

To identify an image pattern and one or more corresponding features, at least one embodiment includes using vector space and performing one or more mathematical operations on at least a portion of the features. In order to obtain improved results when extracting text from an image/document, one or more embodiments can include preprocessing the image(s) and/or otherwise readying the image(s) for an extraction process (as, for example, the image(s) can be derived from heterogeneous sources of varying levels of quality). Such an embodiment can include, for example, performing image preprocessing using one or more OpenCV libraries, which provide functions such as inverting an image, binarization, noise reduction, dilation and erosion, rotation and de-skewing, removing borders, etc., to ensure the image is cleaned before an extraction process.

As detailed herein, one or more embodiments include implementing a smart image classification engine, which is responsible for analyzing extracted text leveraging one or more NLP techniques and classifying the image (of which the text is a part of) into one of multiple security-related and/or privacy-related classes (e.g., as determined by a given enterprise associated with the images). By way of illustration, a given enterprise may generate and maintain various documents (e.g., non-image documents) with different classifications on security and/or privacy. In such an embodiment, a smart image classification engine leverages at least a portion of these documents as the corpus data for the NLP techniques utilized. With the help of NLP and one or more classification techniques utilizing supervised learning, the smart image classification engine classifies one or more images into various security and/or privacy classes (e.g., highly restricted, restricted, public, private, etc.). Such actions can be carried out, for example, using NLP techniques and a classification algorithm such as a support vector machine (SVM). Additionally, the smart image classification engine can use at least one corpus to train the model on what word(s) and/or phrase(s) will classify under which category or categories. An SVM algorithm is used to classify image text content in one or more embodiments based at least in part on the high degree of accuracy provided compared to other supervised learning algorithms, and also based at least in part on a corresponding kernel trick to handle non-linear input spaces.

In such an embodiment, the content of the image text is passed to the model for classification, and SVM performs multi-class classification of the content by finding the hyperplane that differentiates the classes in n-dimensional space. The SVM algorithm draws that hyperplane by transforming the data with the help of mathematical functions referred to as kernels. At least one embodiment can include utilizing one or more types of kernels, such as, for example, a kernel referred to as radial basis function (RBF), which supports non-linearity.

As noted above, the smart image classification engine can be trained using corpus data as training datasets. Such corpus data will contain the words and/or phrases that help dictate image classification (based on the text data contained within the given image(s)). For example, the presence of personal and/or sensitive information (e.g., credit card information, user identification information, etc.) can be associated with a classification of the content as highly restricted.

FIG. 6 shows architecture of an example smart image classification engine in an illustrative embodiment. By way of illustration, FIG. 6 depicts smart image classification engine 616 obtaining extracted text 660 from at least one image, and processing such text as follows. Initially, text preprocessing techniques 662 are implemented. By way of example, such text preprocessing techniques can include cleaning image text by removing any unwanted characters and stop words from the image, which can involve stemming and lemmatization as well as changing text to lower case, remove punctuation, remove bad characters, etc. Once the text is preprocessed, at least a portion of the resulting text can be processed for feature engineering via feature engineering component 664, wherein the text can be converted to a matrix of token counts (e.g., using CountVectorizer) and then transformed to a term frequency-inverse document frequency (TFIDF) representation. Accordingly, to make natural language work for machine learning algorithms, the language data needs to be converted into vectors and/or numbers, and this can be achieved, for example, by using a CountVectorizer function which converts each word into one or more vectors based on the frequency of the word's appearance in the text. As used herein, TFIDF is a statistical algorithm which evaluates how important a word is to a document, and the importance can increase proportionally to the number of times a word appears in the document, while being offset by the frequency of the word in a related corpus.

Once the above-noted vectorization step is carried out via feature engineering component 664 (e.g., using CountVectorizer from a SciKitLearn library), the output can be processed by a machine learning model 668 (e.g., a linear SVM). Trained using related corpus data 666, such a machine learning model 668 can be used to predict the classification (e.g., highly restricted 670, restricted 672, public 674, etc.) of the given image by processing the output of feature engineering component 664. A linear SVM is a classification algorithm that uses linear hyperplanes to separate classes, and represents a type of model wherein the data points are classified based on their presence with respect to the linear hyperplane(s). If, for example, the data point to the left or the top of the line is one class, then the point to the right or the bottom of the line is another class. Such classes can represent, for example, private and/or secure images or public and/or non-secure images. Based on the text which are converted to numbers, such an SVM classifier separates the images into one of the two classes. Additionally, in one or more embodiments, hyperparameter tuning can be carried out, for example, to improve performance and accuracy of the model (e.g., the linear SVM).

In at least one embodiment, a smart image classification engine can be implemented using Python, one or more SciKitLearn libraries, Pandas, Numpy, and/or at least one NLTK corpus. By way of example, FIG. 7 shows example pseudocode for implementing at least a portion of a smart image classification engine in an illustrative embodiment. In this embodiment, example pseudocode 700 is executed by or under the control of at least one processing system and/or device. For example, the example pseudocode 700 may be viewed as comprising a portion of a software implementation of at least part of automated security-based image classification system 105 of the FIG. 1 embodiment.

The example pseudocode 700 illustrates text cleanup techniques carried out by removing stop-words and unwanted characters using an NLTK corpus. Then the content is split into training and testing datasets. Additionally, an SVM classifier is created with at least one CountVectorizer class from a SciKitLearn library, followed by implementation of a TFIDF transformer and an SGDClassifier. The model is trained first with the training dataset before being used for prediction with the testing dataset. The accuracy of the model is also calculated, after the prediction is generated, for hyperparameter tuning to improve accuracy.

It is to be appreciated that this particular example pseudocode shows just one example implementation of at least a portion of a smart image classification engine, and alternative implementations of the process can be used in other embodiments.

As detailed herein, one or more embodiments include combining computer vision techniques and neural networks to semantically analyze images stored in an image and/or content repository, and extracting text data from such images that can be used for analysis and classification of the images. Such an embodiment also includes leveraging one or more NLP techniques (e.g., NLTK, TFIDF, SVM, etc.) to process at least a portion of the extracted text to classify the images into various security-related and/or privacy-related classes that can be used as metadata of the image for appropriate handling and/or initiation of one or more automated actions.

It is to be appreciated that a "model," as used herein, refers to an electronic digitally stored set of executable instructions and data values, associated with one another, which are capable of receiving and responding to a programmatic or other digital call, invocation, and/or request for resolution based upon specified input values, to yield one or more output values that can serve as the basis of computer-implemented recommendations, output data displays, machine control, etc. Persons of skill in the field may find it convenient to express models using mathematical equations, but that form of expression does not confine the model(s) disclosed herein to abstract concepts; instead, each model herein has a practical application in a processing device in the form of stored executable instructions and data that implement the model using the processing device.

Figure 8:
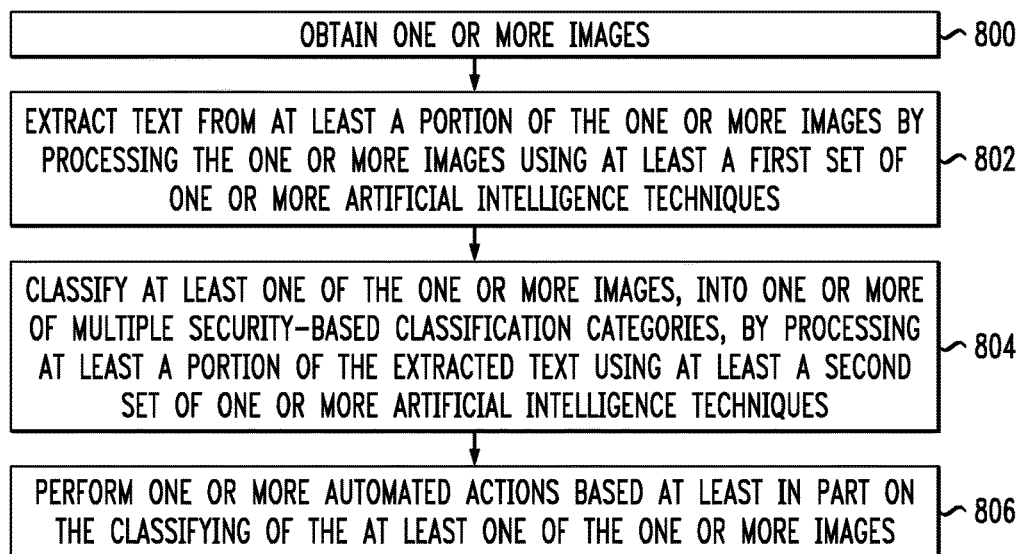
FIG. 8 is a flow diagram of a process for security-based image classification using artificial intelligence techniques in an illustrative embodiment.

FIG. 8 is a flow diagram of a process for security-based image classification using artificial intelligence techniques in an illustrative embodiment. It is to be understood that this particular process is only an example, and additional or alternative processes can be carried out in other embodiments.

In this embodiment, the process includes steps 800 through 806. These steps are assumed to be performed by automated security-based image classification system 105 utilizing elements 112, 114, 116 and 118.

Step 800 includes obtaining one or more images. In at least one embodiment, obtaining one or more images includes obtaining one or more user-produced images from at least one enterprise-related management system in connection with one or more enterprise processes.

Step 802 includes extracting text from at least a portion of the one or more images by processing the one or more images using at least a first set of one or more artificial intelligence techniques. In one or more embodiments, extracting text from at least a portion of the one or more images includes processing the one or more images using at least one mask region-based convolutional neural network trained with optical character recognition-related data. In such an embodiment, processing the one or more images using the at least one mask region-based convolutional neural network can include implementing one or more boundary boxes within the one or more images, wherein the one or more boundary boxes are associated with regions within the one or more images that are predicted to contain text, and identifying text data contained in each of the one or more boundary boxes.

Step 804 includes classifying at least one of the one or more images, into one or more of multiple security-based classification categories, by processing at least a portion of the extracted text using at least a second set of one or more artificial intelligence techniques. In at least one embodiment, classifying at least one of the one or more images includes processing at least a portion of the extracted text using one or more natural language processing techniques and at least one support vector machine. In such an embodiment processing at least a portion of the extracted text using one or more natural language processing techniques and at least one support vector machine can include determining content of at least a portion of the extracted text using the one or more natural language processing techniques, and performing, using the at least one support vector machine, at least one multi-class classification of the content by identifying at least one hyperplane that differentiates two or more of the multiple security-based classification categories in at least one n-dimensional space. Identifying at least one hyperplane can include, for example, transforming at least a portion of the content using one or more kernel functions. Further, in such an embodiment, determining content of at least a portion of the extracted text using the one or more natural language processing techniques can include converting the at least a portion of the extracted text to at least one matrix of token counts and transforming the at least one matrix to at least one term frequency-inverse document frequency representation.

Step 806 includes performing one or more automated actions based at least in part on the classifying of the at least one of the one or more images. In one or more embodiments, performing one or more automated actions includes augmenting the at least one image with classification-related metadata. Additionally or alternatively, performing one or more automated actions can include automatically training, using feedback related to the classifying of the at least one of the one or more images, at least one of the first set of one or more artificial intelligence techniques and the second set of one or more artificial intelligence techniques.

Accordingly, the particular processing operations and other functionality described in conjunction with the flow diagram of FIG. 8 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically classify images on at least one security basis using artificial intelligence techniques. These and other embodiments can effectively introduce proactive processing of images in furtherance of complying with advanced data privacy standards and regulations, as well as reducing security risks and improving user satisfaction.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines.

The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
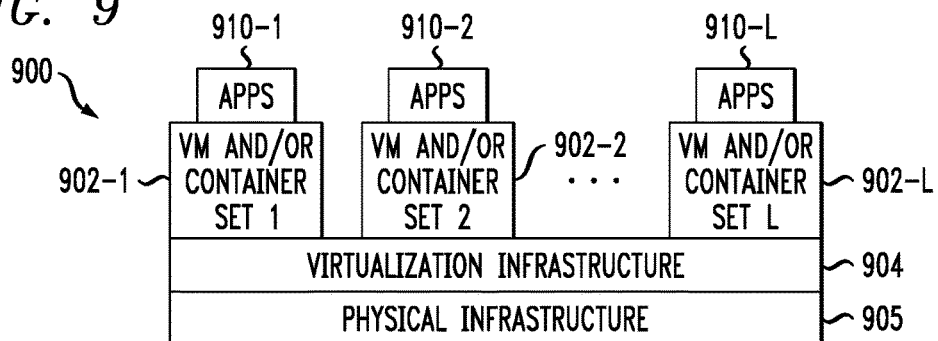
FIGS. 9 and 10 show examples of processing platforms that may be utilized to implement at least a portion of an information processing system in illustrative embodiments.
Figure 10:
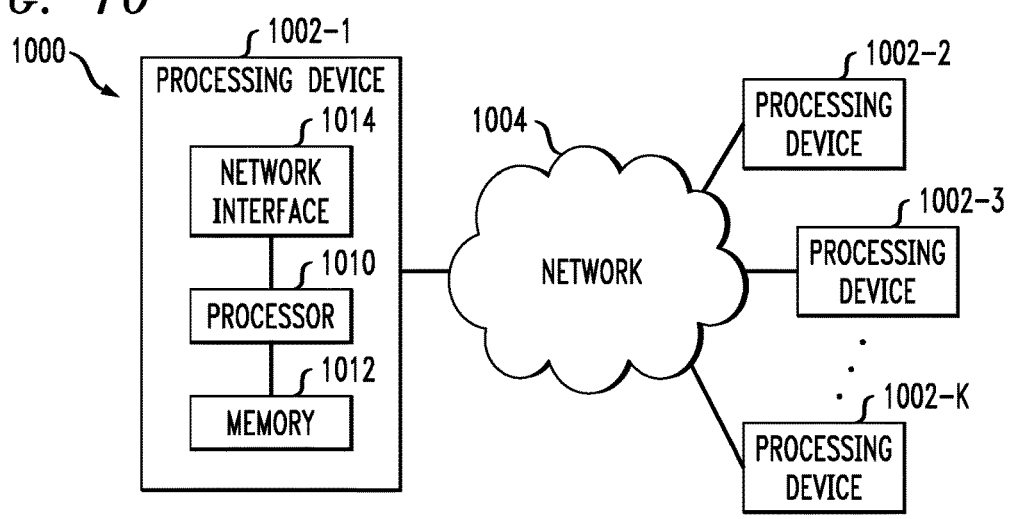

FIG. 9 shows an example processing platform comprising cloud infrastructure 900. The cloud infrastructure 900 comprises a combination of physical and virtual processing resources that are utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 comprise respective VMs, respective sets of one or more containers, or respective sets of one or more containers running in VMs. In some implementations of the FIG. 9 embodiment, the VMs/container sets 902 comprise respective VMs implemented using virtualization infrastructure 904 that comprises at least one hypervisor.

A hypervisor platform may be used to implement a hypervisor within the virtualization infrastructure 904, wherein the hypervisor platform has an associated virtual infrastructure management system. The underlying physical machines comprise one or more information processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1002-1 in the processing platform 1000 comprises a processor 1010 coupled to a memory 1012.

The processor 1010 comprises a microprocessor, a CPU, a GPU, a TPU, a microcontroller, an ASIC, a FPGA or other type of processing circuitry, as well as portions or combinations of such circuitry elements.

The memory 1012 comprises random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining one or more images;
extracting text from at least a portion of the one or more images by processing the one or more images using at least a first set of one or more artificial intelligence techniques;
classifying at least one of the one or more images, into one or more of multiple security-based classification categories, by processing at least a portion of the extracted text using at least a second set of one or more artificial intelligence techniques, wherein classifying at least one of the one or more images comprises determining content of at least a portion of the extracted text using one or more natural language processing techniques, and classifying, using at least one artificial intelligence-based multi-class classification algorithm, the content into at least one of the multiple security-based classification categories at least in part by identifying at least one hyperplane that differentiates two or more of the multiple security-based classification categories in at least one n-dimensional space; and
performing one or more automated actions based at least in part on the classifying of the at least one of the one or more images, wherein performing one or more automated actions comprises augmenting the at least one image with classification-related metadata;
wherein the method is performed by at least one processing device comprising a processor coupled to a memory.

2. The computer-implemented method of claim 1, wherein extracting text from at least a portion of the one or more images comprises processing the one or more images using at least one mask region-based convolutional neural network trained with optical character recognition-related data.

3. The computer-implemented method of claim 2, wherein processing the one or more images using the at least one mask region-based convolutional neural network comprises:
implementing one or more boundary boxes within the one or more images, wherein the one or more boundary boxes are associated with regions within the one or more images that are predicted to contain text; and
identifying text data contained in each of the one or more boundary boxes.

4. The computer-implemented method of claim 1, wherein classifying at least one of the one or more images comprises processing at least a portion of the extracted text using the one or more natural language processing techniques and at least one support vector machine.

5. The computer-implemented method of claim 4, wherein processing at least a portion of the extracted text using the one or more natural language processing techniques and at least one support vector machine comprises determining content of at least a portion of the extracted text using the one or more natural language processing techniques, and classifying, using the at least one support vector machine, the content into at least one of the multiple security-based classification categories at least in part by identifying at least one hyperplane that differentiates two or more of the multiple security-based classification categories in at least one n-dimensional space.

6. The computer-implemented method of claim 1, wherein identifying at least one hyperplane comprises transforming at least a portion of the content using one or more kernel functions.

7. The computer-implemented method of claim 1, wherein determining content of at least a portion of the extracted text using the one or more natural language processing techniques comprises converting the at least a portion of the extracted text to at least one matrix of token counts and transforming the at least one matrix to at least one term frequency-inverse document frequency representation.

8. The computer-implemented method of claim 1, wherein performing one or more automated actions comprises automatically training, using feedback related to the classifying of the at least one of the one or more images, at least one of the first set of one or more artificial intelligence techniques and the second set of one or more artificial intelligence techniques.

9. The computer-implemented method of claim 1, wherein obtaining one or more images comprises obtaining one or more user-produced images from at least one enterprise-related management system in connection with one or more enterprise processes.

10. A non-transitory processor-readable storage medium having stored therein program code of one or more software programs, wherein the program code when executed by at least one processing device causes the at least one processing device:
to obtain one or more images;
to extract text from at least a portion of the one or more images by processing the one or more images using at least a first set of one or more artificial intelligence techniques;
to classify at least one of the one or more images, into one or more of multiple security-based classification categories, by processing at least a portion of the extracted text using at least a second set of one or more artificial intelligence techniques, wherein classifying at least one of the one or more images comprises determining content of at least a portion of the extracted text using one or more natural language processing techniques, and classifying, using at least one artificial intelligence-based multi-class classification algorithm, the content into at least one of the multiple security-based classification categories at least in part by identifying at least one hyperplane that differentiates two or more of the multiple security-based classification categories in at least one n-dimensional space; and
to perform one or more automated actions based at least in part on the classifying of the at least one of the one or more images, wherein performing one or more automated actions comprises augmenting the at least one image with classification-related metadata.

11. The non-transitory processor-readable storage medium of claim 10, wherein extracting text from at least a portion of the one or more images comprises processing the one or more images using at least one mask region-based convolutional neural network trained with optical character recognition-related data.

12. The non-transitory processor-readable storage medium of claim 10, wherein classifying at least one of the one or more images comprises processing at least a portion of the extracted text using the one or more natural language processing techniques and at least one support vector machine.

13. The non-transitory processor-readable storage medium of claim 10, wherein performing one or more automated actions comprises automatically training, using feedback related to the classifying of the at least one of the one or more images, at least one of the first set of one or more artificial intelligence techniques and the second set of one or more artificial intelligence techniques.

14. An apparatus comprising:
at least one processing device comprising a processor coupled to a memory;
the at least one processing device being configured:
to obtain one or more images;
to extract text from at least a portion of the one or more images by processing the one or more images using at least a first set of one or more artificial intelligence techniques;
to classify at least one of the one or more images, into one or more of multiple security-based classification categories, by processing at least a portion of the extracted text using at least a second set of one or more artificial intelligence techniques, wherein classifying at least one of the one or more images comprises determining content of at least a portion of the extracted text using one or more natural language processing techniques, and classifying, using at least one artificial intelligence-based multi-class classification algorithm, the content into at least one of the multiple security-based classification categories at least in part by identifying at least one hyperplane that differentiates two or more of the multiple security-based classification categories in at least one n-dimensional space; and
to perform one or more automated actions based at least in part on the classifying of the at least one of the one or more images, wherein performing one or more automated actions comprises augmenting the at least one image with classification-related metadata.

15. The apparatus of claim 14, wherein extracting text from at least a portion of the one or more images comprises processing the one or more images using at least one mask region-based convolutional neural network trained with optical character recognition-related data.

16. The apparatus of claim 14, wherein classifying at least one of the one or more images comprises processing at least a portion of the extracted text using the one or more natural language processing techniques and at least one support vector machine.

17. The apparatus of claim 14, wherein performing one or more automated actions comprises automatically training, using feedback related to the classifying of the at least one of the one or more images, at least one of the first set of one or more artificial intelligence techniques and the second set of one or more artificial intelligence techniques.

18. The apparatus of claim 14, wherein identifying at least one hyperplane comprises transforming at least a portion of the content using one or more kernel functions.

19. The apparatus of claim 14, wherein determining content of at least a portion of the extracted text using the one or more natural language processing techniques comprises converting the at least a portion of the extracted text to at least one matrix of token counts and transforming the at least one matrix to at least one term frequency-inverse document frequency representation.

20. The apparatus of claim 14, wherein obtaining one or more images comprises obtaining one or more user-produced images from at least one enterprise-related management system in connection with one or more enterprise processes.

* * * * *